United States Patent [19]

Hongo

[11] Patent Number: 4,701,961
[45] Date of Patent: Oct. 20, 1987

[54] CHARACTER IDENTIFYING APPARATUS

[75] Inventor: Yasuo Hongo, Kanagawa, Japan

[73] Assignee: Fuji Electric Company, Ltd., Kanagawa, Japan

[21] Appl. No.: 727,889

[22] Filed: Apr. 26, 1985

[30] Foreign Application Priority Data

Apr. 27, 1984 [JP] Japan .................................. 59-84080

[51] Int. Cl.$^4$ ............................................... G06K 9/62
[52] U.S. Cl. ......................................... 382/34; 382/47
[58] Field of Search ...................... 382/30, 33, 34, 47, 382/27

[56] References Cited

U.S. PATENT DOCUMENTS 3,601,802  8/1971  Nahagame ........................... 382/34
3,644,890  2/1972  Matthews ............................. 382/33
4,481,664 11/1984  Linger et al. .......................... 382/8

OTHER PUBLICATIONS

Y. Hongo, Automatic Visual Measurement Applied to a Cashless Cafeteria System, IECON '84, Conference Publication.

Primary Examiner—Leo H. Boudreau
Attorney, Agent, or Firm—Finnegan, Henderson, Farabow, Garrett and Dunner

[57] ABSTRACT

A character identifying device generates a core bit matrix and a mask bit matrix for each reference character pattern scanned by a television camera or like device. The two matrices represent binary coded representation of a reference character pattern at two different threshold levels. An enlarged matrix representation and a contracted matrix representation of the same unknown character pattern are compared to the core bit matrix and the mask bit matrix, respectively, of each reference character pattern and corresponding correlation output signals are generated to unable the identification of the reference character pattern most closely correlated to the unknown character pattern.

2 Claims, 21 Drawing Figures

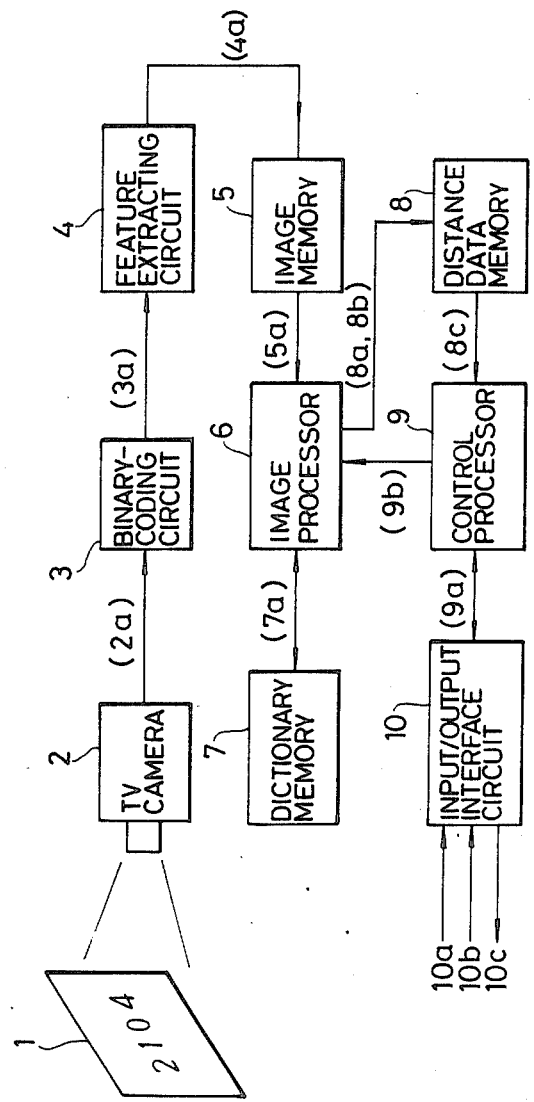

FIG. 12
| E | D | C |
|---|---|---|
| F | Ⓐ | B |
| G | H | I |
FIG. 13
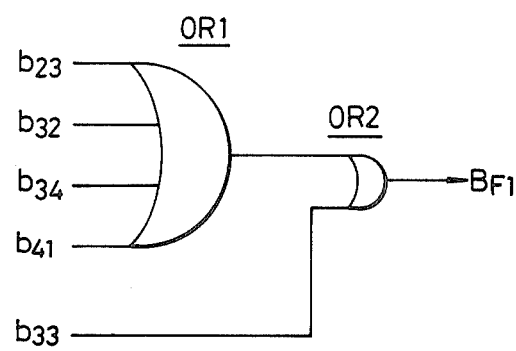
FIG. 14
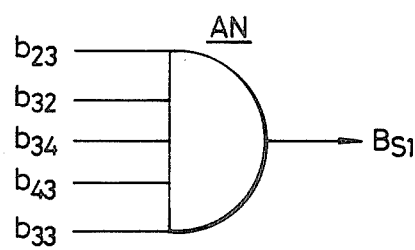

CHARACTER IDENTIFYING APPARATUS

FIELD OF THE INVENTION

This invention relates to a device which uses an optical sensor, for example a camera, to read and prepare for optical processing a variety of characters such as stamped characters, molded characters, and printed characters.

BACKGROUND OF THE INVENTION

One example of a conventional device of this type is a reading device employing a fixed-point sampling method. With this type of a reading device, however, it has been difficult to evaluate the quality of a character because attributes such as separation and smudge have not been defined. Also, it was necessary to learn and store all possible characters to be read to avoid the situation where the device reads a character that it has not yet learned.

OBJECTS AND SUMMARY OF THE INVENTION

An object of the present invention is the accurate and efficient identification of character patterns produced by stamping, molding and printing.

Another object of the present invention is a character identifying apparatus capable of identifying smudged character patterns.

A further object of the present invention is a character identifying apparatus capable of identifying variably separated characters.

Still another object of the present invention is a character identifying device for identifying unknown character patterns through correlations with known reference patterns.

These and other objects are accomplished by a character identifying device for identifying an unknown character pattern by processing a video signal generated by scanning the unknown character pattern and video signals generated by scanning reference character patterns, the device comprising means for producing binary coded signals of the video signals corresponding to the reference character patterns and the unknown character pattern, means for subdividing the binary coded signals corresponding to the reference character patterns into segments and for extracting feature data included in each segment, means for forming a plurality of bit matrices from the extracted feature data, each of the bit matrices being associated with selected segments that correspond to a different one of the scanned reference character patterns, means for forming a core bit matrix and an associated mask bit matrix from each of the bit matrices, each of the core bit matrices and the mask bit matrices associated therewith corresponding to a different one of the reference character patterns, means for forming an enlarged bit matrix and a contracted bit matrix from the binary coded signals corresponding to the unknown character pattern, and means for comparing the enlarged bit matrix to each of the core bit matrices and the contracted bit matrix to the mask bit matrices associated with the core bit matrices and for outputting comparison signals to unable the identification of the unknown character pattern as the reference character pattern having the closest correlations of the associated core bit matrix and the mask bit matrix with the enlarged bit matrix and the contracted bit matrix, respectively.

BRIEF DESCRIPTION OF THE DRAWINGS

The manner in which the above and other objects, features, and advantages of the present invention are achieved and the construction and operation of the invention itself will be more apparent upon reading the following detailed description in view of the drawings, wherein:

FIG. 1(a) is a schematic block diagram of an embodiment of the character identifying apparatus of the present invention;

FIG. 5 is a diagram showing a first bit matrix;

FIG. 6 is a diagram showing a second bit matrix;

FIG. 7 is a diagram showing a core bit matrix;

FIG. 8 is a diagram showing a mask bit matrix;

FIG. 9 is an explanatory diagram for a description of a method for obtaining a core bit matrix;

FIG. 12 is an explanatory diagram for a description of an enlarging process and a contracting process;

FIG. 13 is a diagram of an enlarging circuit of the character identifying apparatus of the present invention;

FIG. 14 is a diagram of a contracting circuit of the character identifying apparatus of the present invention.

DETAILED DESCRIPTION

Figure 1B:
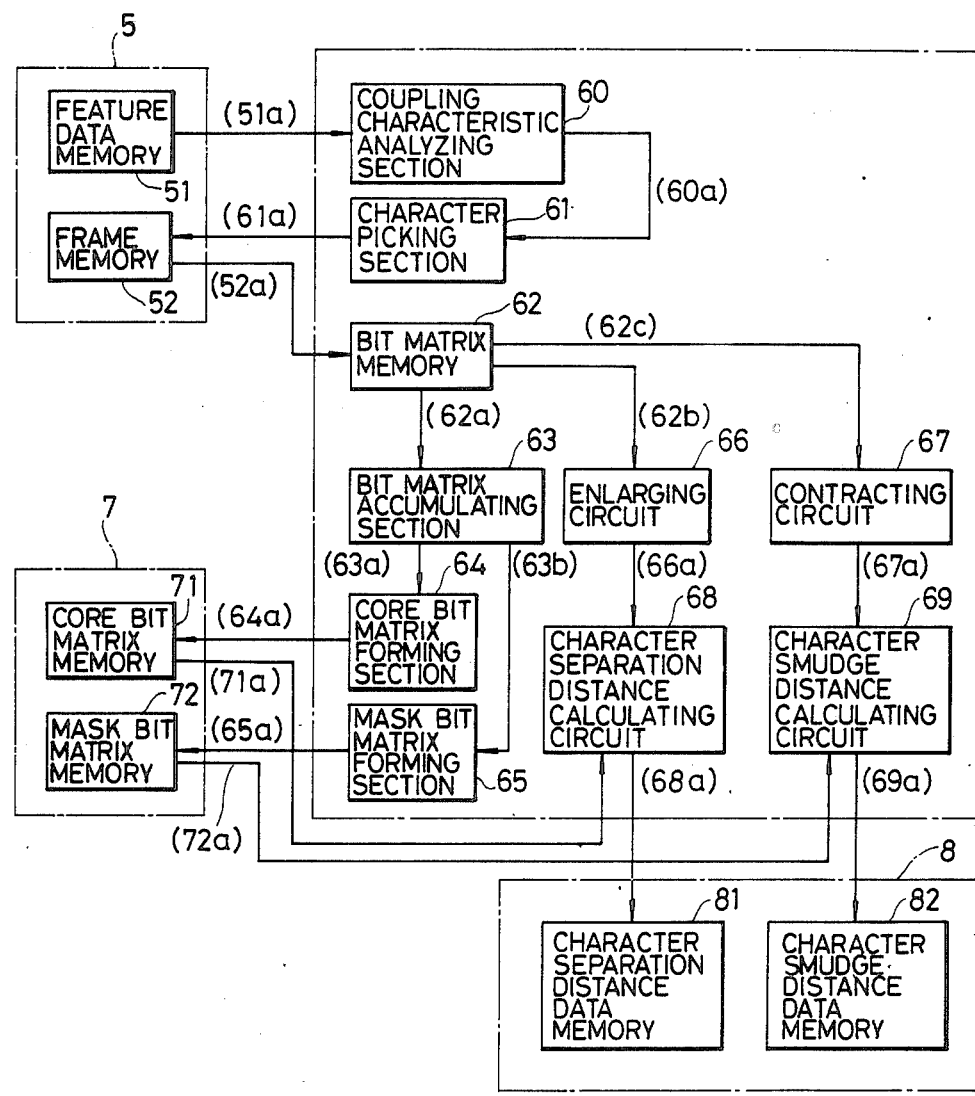
FIG. 1(b) is a detailed block diagram of an image processor included in the apparatus of FIG. 1(a)

FIG. 1(a) is a diagram showing an embodiment of the present invention. FIG. 1(b) is a block diagram showing an embodiment of an image processor used in the device of FIG. 1(a). In FIG. 1(a), an object 1 to be identified is scanned by a television camera 2. The output of the camera 2 is processed by a binary-coding circuit 3, a feature extracting circuit 4, an image memory 5, an image processor 6, a dictionary memory 7, a distance data memory 8, a control processor 9, and an input/output interface circuit 10.

Characters on the object 1 are photographed with the television camera 2, and the video signal 2a is binary-coded by the binary-coding circuit 3. Geometrical image data is extracted from the binary-coded signal 3a by the feature extracting circuit 4 and stored in the image memory 5 in a DMA (direct memory access) mode. The image processor 6 reads image data 5a out of the image memory 5 to form character dictionary data 7a that is stored in the dictionary memory 7.

The control processor 9 applies a process instruction 9b to the image processor 6 to cause the calculation of the character separation distance 8a and the character smudge distance 8b of an unknown character. According to the distance data 8c stored in the distance data memory 8, the control processor 9 determines what the unknown character is, and outputs the result of the determination through the input/output interface 10.

When the character reading device receives a learning instruction 10a or a decision instruction 10b, the control processor 9 applies the instruction to the image processor 6 to cause the result of the operations of image processor 6 to be transmitted through the input/output interface to the outside.

The processor 6, as shown in FIG. 1(b), comprises a coupling characteristic analyzing section 60, a character picking section 61, a bit matrix memory 62, a bit matrix accumulating section 63, a core bit matrix forming section 64, a mask bit matrix forming section 65, an enlarging circuit 66, a contracting circuit 67, a character separation distance calculating circuit 68, and a character smudge distance calculating circuit 69. Also shown in FIG. 1(b) are a feature data memory 51, a frame memory 52, a core bit matrix memory 71, a mask bit matrix memory 72, a character separation distance data memory 81, and a character smudge distance data memory 82.

The data 51a in the feature data memory 51 are applied to the coupling characteristic analyzing section 60, where they are divided into individual blob (pattern) feature data through coupling characteristic analysis. Next, a blob's circumscribed frame coordinate data 60a causes the character picking section 61 to pick character bit data out of the frame memory 52. Binary-coded character bit data are stored in the frame memory 52 as they are, and a character bit matrix is extracted out of the frame memory 52 and supplied to the bit matrix memory 62. The above-described bit matrix picking operation is employed for both learning and identification and is a subject of U.S. patent application Ser. No. 504,263 of the present inventor filed on June 14, 1983, and entitled "Pattern Recognition Apparatus".

In the learning process, the bit matrix data 62a are accumulated in the bit matrix accumulating section 63, and are supplied, as accumulation matrices 63a and 63b, to the core bit matrix forming section 64 and the mask bit matrix forming section 65, respectively. The core bit matrix 64a and the mask bit 65a are stored in the core bit matrix memory 71 and the mask bit matrix memory 72 in the dictionary memory 7, respectively.

In the identifying process, the core bit matrix 71a and the mask bit matrix 72a in the dictionary memory 7 are collated with unknown bit matrices 62b and 62c, to obtain distances. The character separation distance 68a is obtained by enlarging the bit matrix 62b in the enlarging circuit 66 and performing a distance calculation in the character separation distance calculating circuit 68. The character smudge distance 69a is obtained by contracting the bit matrix 62c in the contracting circuit 67 and performing a distance calculation in the character smudge distance calculating circuit 69. The distance data 68a and 69a are stored in the character separation distance data memory 81 and the character smudge distance data memory 82, respectively.

As is well known in the art, picture signals of patterns to be learned are obtained by horizontal and vertical scanning (raster-scanning) by image pickup means such as a television camera. The picture signals are binary-coded according to a predetermined level and divided into picture elements having a certain size. A series of the picture elements on a horizontal scanning line which represent a portion of the pattern is referred to as a "segment" with the result that each pattern can be expressed by a combination of segments.

In order to determine whether or not the segments belong to the same pattern, it is necessary to determine the relations among the segments by analyzing the coupling characteristic. The segments are often different from one another in the coordinates of their end points and in their lengths and it is necessary to detect feature data for each segment and to determine, according to the coupling conditions of the picture elements, the patterns to which the segments belong.

Figure 2:
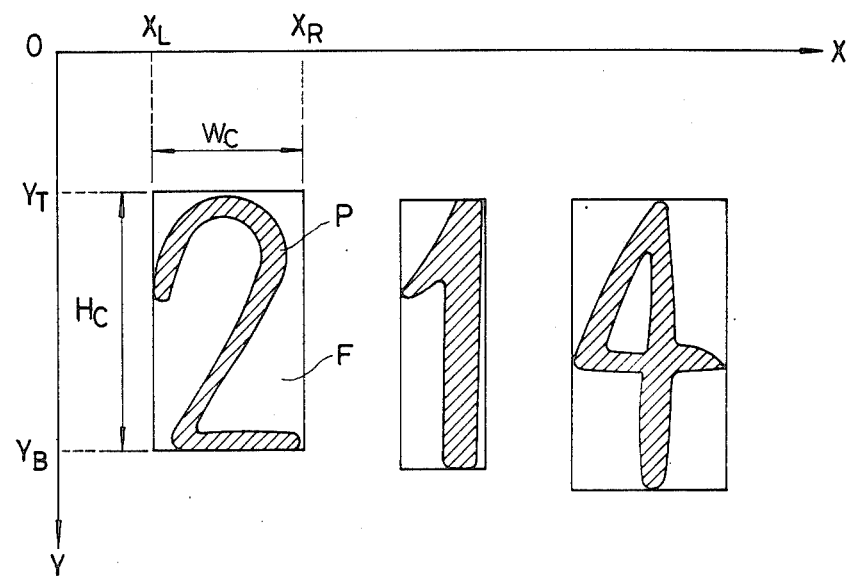
FIG. 2 is an explanatory diagram for a description of an example of a binary-coded image.

The coupling characteristic analyzing section 60 in FIG. 1(b) is employed for analyzing the coupling characteristics of the picture elements. This operation is carried out on the feature data stored in the feature data memory 51. It is assumed that one of the patterns extracted is as indicated at P in FIG. 2. A pattern width $W_C$ is obtained which is the difference between the left end X-coordinate $X_L$ and the right end X-coordinate $X_R$. A pattern height is also obtained which is the difference between the upper Y-coordinate $Y_T$ and the lower Y-coordinate $Y_B$. When these values are within predetermined ranges, the pattern is extracted (the others being treated as noise).

Figures 3, 4:
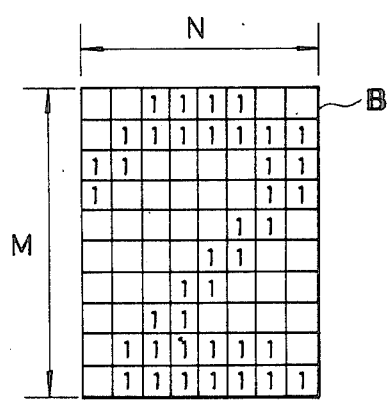
FIG. 3 is an explanatory diagram for a description of one example of a bit matrix.
FIG. 4 is an explanatory diagram for a description of an accumulation matrix.

The pattern taken by the circumscribed frame which is defined by the width $W_C$ and the height $H_C$ is divided into M×N regions, and it is detected whether or not each region contains a portion of the pattern. When a region has a portion of the pattern in it, that region is assigned the value "1" and when it has no portion of the pattern in it, that region is assigned the value "0." In this manner, the pattern P in FIG. 2 can be expressed as shown in FIG. 3. Hereinafter, it will be considered as a matrix, and will be referred to as "a bit matrix B" when applicable. It should be noted that each of the blanks of the bit matrix B as shown in FIG. 3 represents a value "0" unless otherwise specified.

The character picking section 61 (FIG. 1(b)) carries out the above-described pattern taking operation and bit matrix extraction by referring to the frame memory 52. The bit matrix is stored in the bit matrix memory 62.

The bit matrix extraction is carried out only once in the case of the identification mode, but it is performed a predetermined number of times in the case of the learning mode. Therefore, in the latter case, the bit matrix accumulating section 63 (FIG. 1(b)) collects the results of the bit matrix extraction which is carried out $N_L$ times to obtain an accumulation matrix $B_A$ as shown in FIG. 4. That is, the accumulation matrix $B_A$ can be represented by the following expression (1):

$$B_A = \sum_{i=1}^{N_L} B_i \qquad (1)$$

where $B_i$ is the measured bit matrix.

Figures 5, 6, 7, 8:
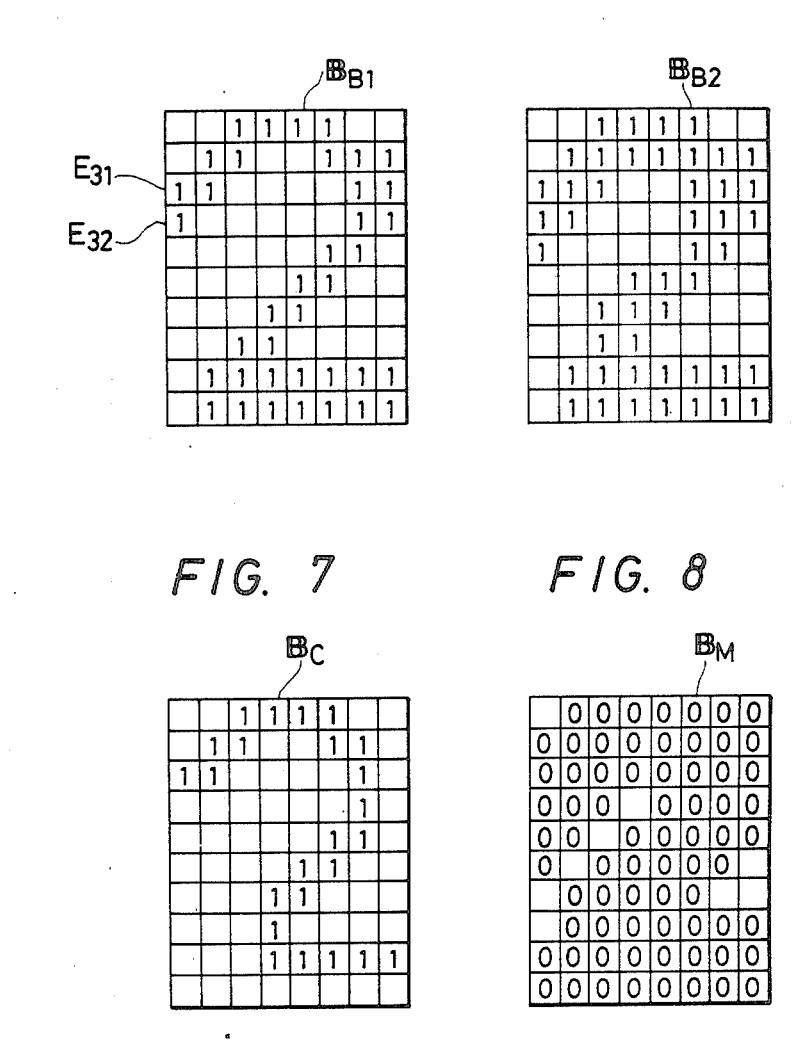

In the case of FIG. 4, $N_L = 20$. A numeral given to each region means the number of times (frequency) of the region having the value "1." The blank regions are "0," because they never have the value "1." A first bit matrix $B_{B1}$ as shown in FIG. 5 and a second bit matrix $B_{B2}$ as shown in FIG. 6 are obtained from the accumulation matrix $B_A$ according to the following method. For instance, the limits $N_{L1}$ and $N_{L2}$, are set to 18 and 5 for the first and second bit matrices, respectively. When any element of the accumulation matrix $B_A$ becomes "1" more times than $N_{L1}$ (or $N_{L2}$) times, a "1" is assigned to it, to obtain the first (or second) bit matrix. Accordingly, the elements having repetition values of "2", "3" or "4" in FIG. 4 have a "0" value in FIGS. 5 and 6. The first and second bit matrices $B_{B1}$ and $B_{B2}$ are utilized to form a core bit matrix $B_C$ as shown in FIG. 7 and a mask bit matrix $B_M$ as shown in FIG. 8 according to the following methods.

Figure 9:
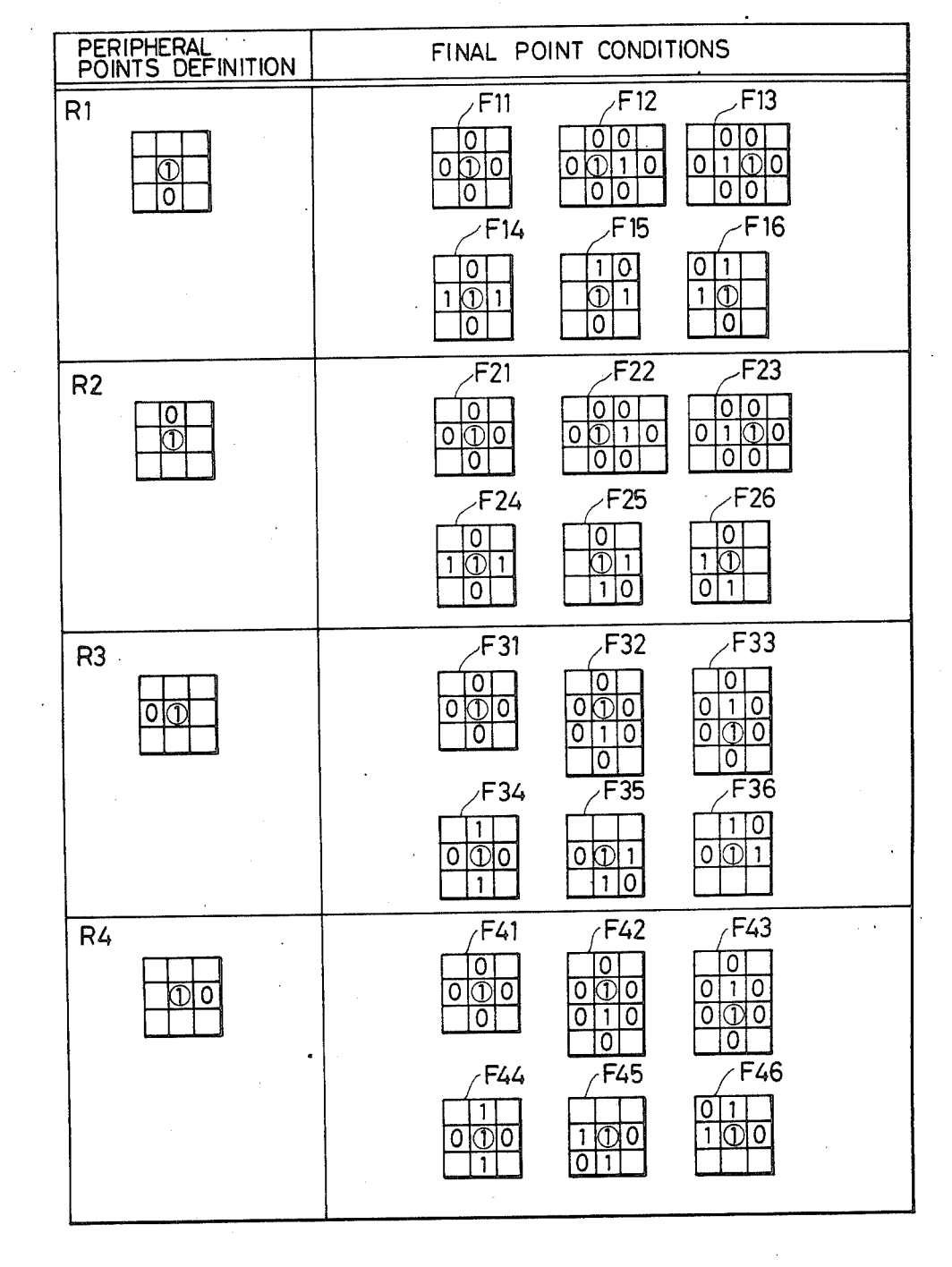

The core bit matrix $B_C$ can be obtained by a so-called "thinning method". There are available a variety of thinning methods. The present invention employs a method as shown in FIG. 9. A point in which an aimed pattern element ("1") has a background element ("0") on its lower, upper, left or right side is referred to as "a peripheral point." These four peripheral points are as indicated at R1, R2, R3 and R4 in FIG. 9. In this case, as it is necessary to observe four sides of an aimed element (four connections), a conventional 3×3 two-dimensional local memory is employed. The memory can be formed by three layers of shift registers which make one circulation with the number of matrix elements, and by arranging them in spiral form. If when the first bit matrix $B_{B1}$ as shown in FIG. 5 is horizontally and vertically scanned, the aimed element is of the peripheral point R1, R2, R3 or R4 and satisfies one of the final point conditions F11 through F46, then the element is held as a core element, and if not, a "0" is assigned to the element, i.e., the element is removed. This operation is repeatedly carried out until all of the core elements are obtained. For instance, in FIG. 5, the element $E_{31}$ of the bit matrix is of the peripheral point R2 and satisfies the final point condition F25, and therefore it is held as a core element. The element $E_{32}$ is of the peripheral point R1, but it satisfies none of the final point conditions F11 through F16. Therefore, the element $E_{32}$ is removed as shown in FIG. 7.

Figure 10:
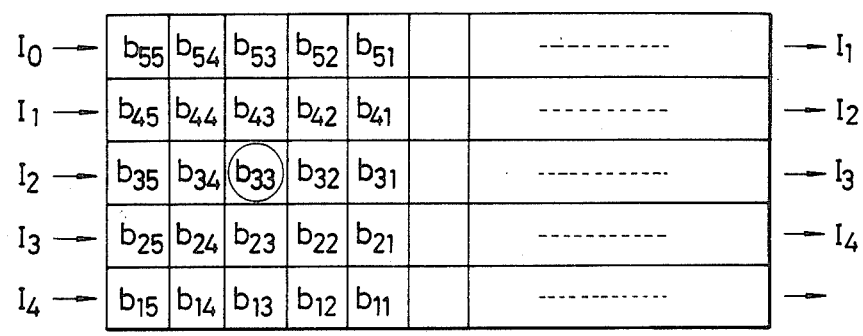
FIG. 10 is a diagram showing a 5×5 two-dimensional local memory.

In FIG. 9, elements encircled are aimed elements, and blank parts indicate the elements which may be "0" or "1." The peripheral point conditions and the final points of the core elements can be readily realized by using circuits utilizing a 5×5 two-dimensional local memory as shown in FIG. 10. For instance, the final point condition F12 of the peripheral point R1 is shown in part (a) of FIG. 11. That is, the elements in FIG. 10 correspond to those in part (a) of FIG. 11.

Figure 11A:
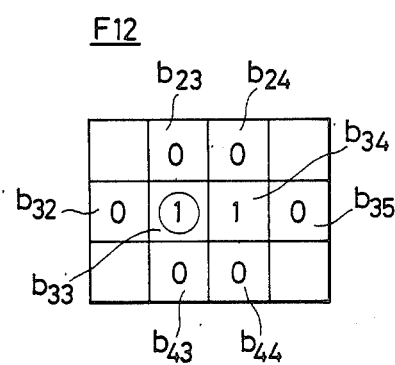
FIG. 11(a) is an explanatory diagram for a description of a core element extracting condition.
Figure 11B:
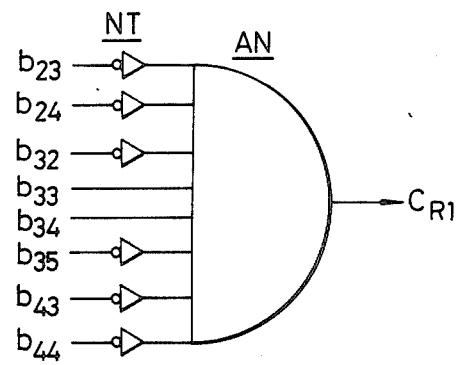
FIG. 11(b) is a circuit for core element extraction.

In the circuit as shown in part (b) of FIG. 11, the elements $b_{33}$ and $b_{34}$ have the value "1", and the remaining elements have the value "0." In part (b) of FIG. 11, reference character NT designates NOT circuits, i.e., inverters, and AN is an AND circuit. Similarly, the final point conditions F21 through F46 of the other peripheral points R2 through R4 can be realized as circuits. These circuits are juxtaposed in the core matrix forming section 64 in FIG. 1(b), as a result of which a core bit matrix $B_C$ as shown in FIG. 7 is obtained from a first bit matrix as shown in FIG. 5, and is stored as a dictionary in the memory 71.

On the other hand, in section 65 of FIG. 1(b), the mask bit matrix $B_M$ as shown in FIG. 8 is obtained from the second bit matrix as shown in FIG. 6 as follows;

It is assumed that the aimed element in the matrix shown in FIG. 6 is the element A in FIG. 12. Then, in the four-connection system in which the four elements on the upper, lower, right and left sides of the aimed element are taken into account, an expanding method is carried out in which if at least one of the four elements B, D, F and H is "1", then the element A is also "1."

An embodiment of the enlarging circuit is shown in FIG. 13. In FIG. 13, reference characters OR1 and OR2 designate OR circuits, and $b_{23}$, $b_{32}$, $b_{34}$, $b_{43}$ and $b_{33}$ correspond to the elements D, F, B, H and A in FIG. 12, indicating the contents ("1" and "0") of the elements expressed in the same manner as that in the case of FIG. 10. The enlarging process according to the four-connection system for the second bit matrix $B_{B2}$ is carried out a predetermined number ($N_M$) of times, and then the bit value of each element is complemented, that is, "1" is changed to "0," while "0" is changed into "1." As a result, the mask bit matrix as shown in FIG. 8 is obtained. This can be represented by the following expression (2):

$$B_M = \overline{fN_M(B_{B2})}$$

where the line (———) indicates the bit changing operation.

The mask bit matrix thus formed is stored in the memory 72. The core bit matrix $B_C$ and the mask bit matrix are formed for each character, and they are used as a dictionary in the identification process.

In the identification process, similarly as in the learning process, the bit matrix $B_0$ of an unknown pattern, is obtained through the memory 62 in FIG. 1(b). The bit matrix $B_0$ is enlarged by the enlarging circuit 66 in FIG. 1(b), and contracted by the contracting circuit 67. As was described above, the circuit shown in FIG. 13 can be employed as an enlarging circuit 66. An example of an embodiment of the contracting circuit 67 is as shown in FIG. 14. The contracting process will be described with reference to FIG. 12 showing 3×3 elements. That is, in the contracting process, only when all of the elements A, B, D, F and H are "1," then "1" is assigned to the element A, and in all other cases a "0" is assigned. Accordingly, the contracting process can be achieved by taking the contents $b_{33}$, $b_{34}$, $b_{23}$, $b_{32}$ and $b_{34}$ corresponding respectively to the elements A, B, D, F and H through the AND circuit AN in FIG. 14.

In the enlarging process, the bit matrix $B_0$ of the unknown pattern is applied to the circuit of FIG. 13 $N_1$ times to obtain a bit matrix $B_1$. In the contracting process, the bit matrix $B_0$ is applied to the circuit of FIG. 14 $N_2$ times to obtain a bit matrix $B_2$. These can be expressed by the following equations (3) and (4):

$$B_1 = fN_1(B_0) \qquad (3)$$

$$B_2 = fN_2(B_0) \qquad (4)$$

In the character separation distance calculating circuit 68 and the character smudge distance calculating circuit 69 in FIG. 1(b), a character separation distance $D_C^K$ and a character smudge distance $D_B^K$ (which are represented by the following equations (5) and (6), respectively) are obtained by utilizing unknown bit matrices $B_1$ and $B_2$ and dictionaries $B_C^K$ and $B_M^K$:

$$D_C^K = \text{dist}[B_C^K \cdot \overline{B}_1] \qquad (5)$$

$$D_B^K = \text{dist}[B_M^K \cdot B_2] \qquad (6)$$

The character separation distance $D_C^K$ and the character smudge distance $D_B^K$ are multiplied by weighting coefficients $w_1$ and $w_2$, respectively, to obtain a total distance $D_T^K$.

$$D_T^K = w_1 \cdot D_C^K + w_2 \cdot D_B^K \tag{7}$$

It is assumed that a character $K_1$ makes the total distance $D_T^K$ shortest, that the shortest distance is represented by $D_{T1}$, and that the second shortest distance is represented by $D_{T2}$. With respect to an unknown bit matrix to be identified, when the distance about a dictionary $K_1$ satisfies the following conditions, the result of identification is the character $K_1$:

$$D_{T1} \leq D_{TU} \tag{8}$$

$$|D_{T1} - D_{T2}| \geq D_{TL} \tag{9}$$

$$D_C^K 1 \leq D_{CU} \tag{10}$$

where $D_{TU}$, $D_{TL}$, $D_{CU}$ and $D_{BU}$ are predetermined set values, which can be optionally given.

The set values (decision references) can be changed by the control processor 9 in FIG. 1(a). The term "distance" as used herein means that the elements of two bit matrices are subjected to comparison in such a manner that whenever non-coincidence occurs, a value "1" is given, and the results of comparison are accumulated. Therefore, the distance can be an index for determining the degree of coincidence.

Figure 15:
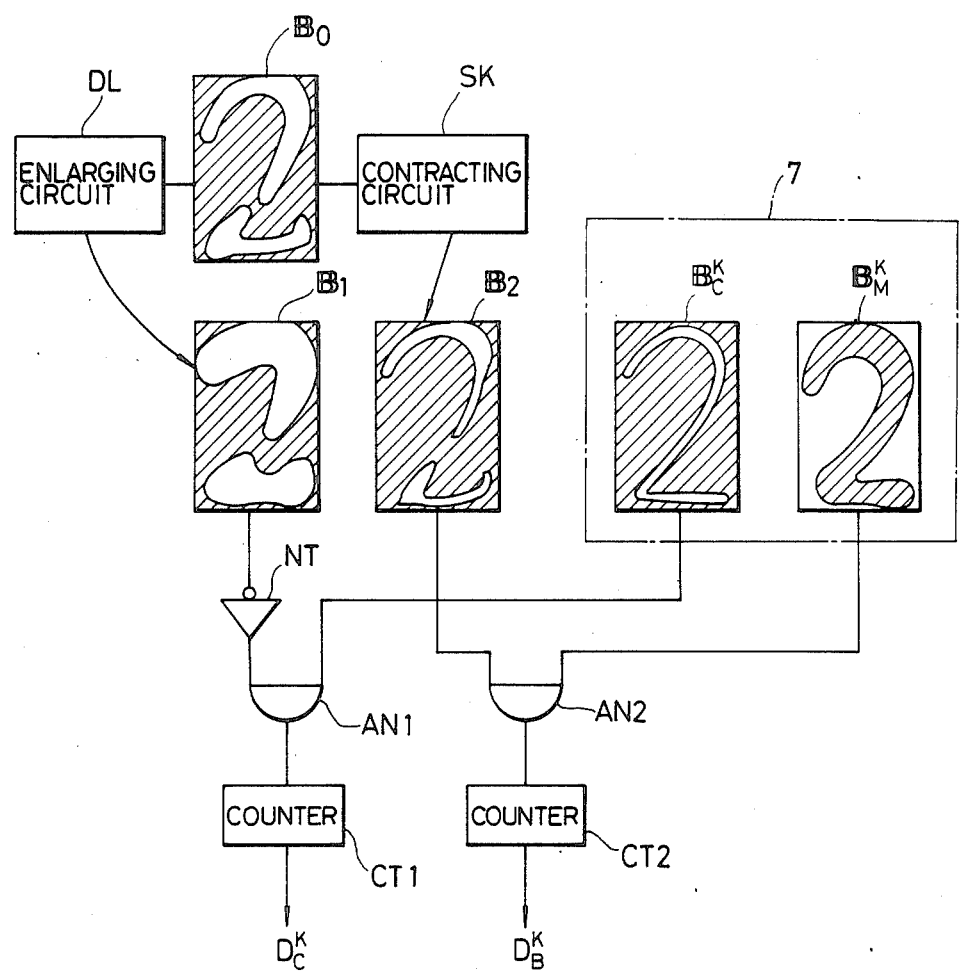
FIG. 15 is a diagram for describing a distance calculating method.

The above-described distance calculation will be summarized with reference to FIG. 15.

As shown in FIG. 15, an enlarging circuit DL and a contracting circuit SK form an enlarged bit matrix $B_1$ and a contracted bit matrix $B_2$, respectively, by using an unknown bit matrix $B_0$ stored in the bit matrix memory 63 in FIG. 1(b). These bit matrices and the core bit matrix $B_C$ and the mask bit matrix $B_M^K$ of a character $K_1$ stored in the dictionary memory 7 are subjected to logic operation (cf. an inverter NT, and AND gates AN1 and AN2). The results of the logic operations are counted by counters CT1 and CT2, to achieve the distance calculation. This distance calculation is carried out for each of the stored character dictionaries ($K = 1, 2, \ldots$).

The control processor 9 performs a decision operation on these distances according to the above-described decision references, i.e., the expressions (8) through (11).

In the above-described embodiment, the four-connection system is employed for processing bit matrices, however, the technical concept of the invention is applicable to the case also where an eight-connection system is employed.

Figure 1C:
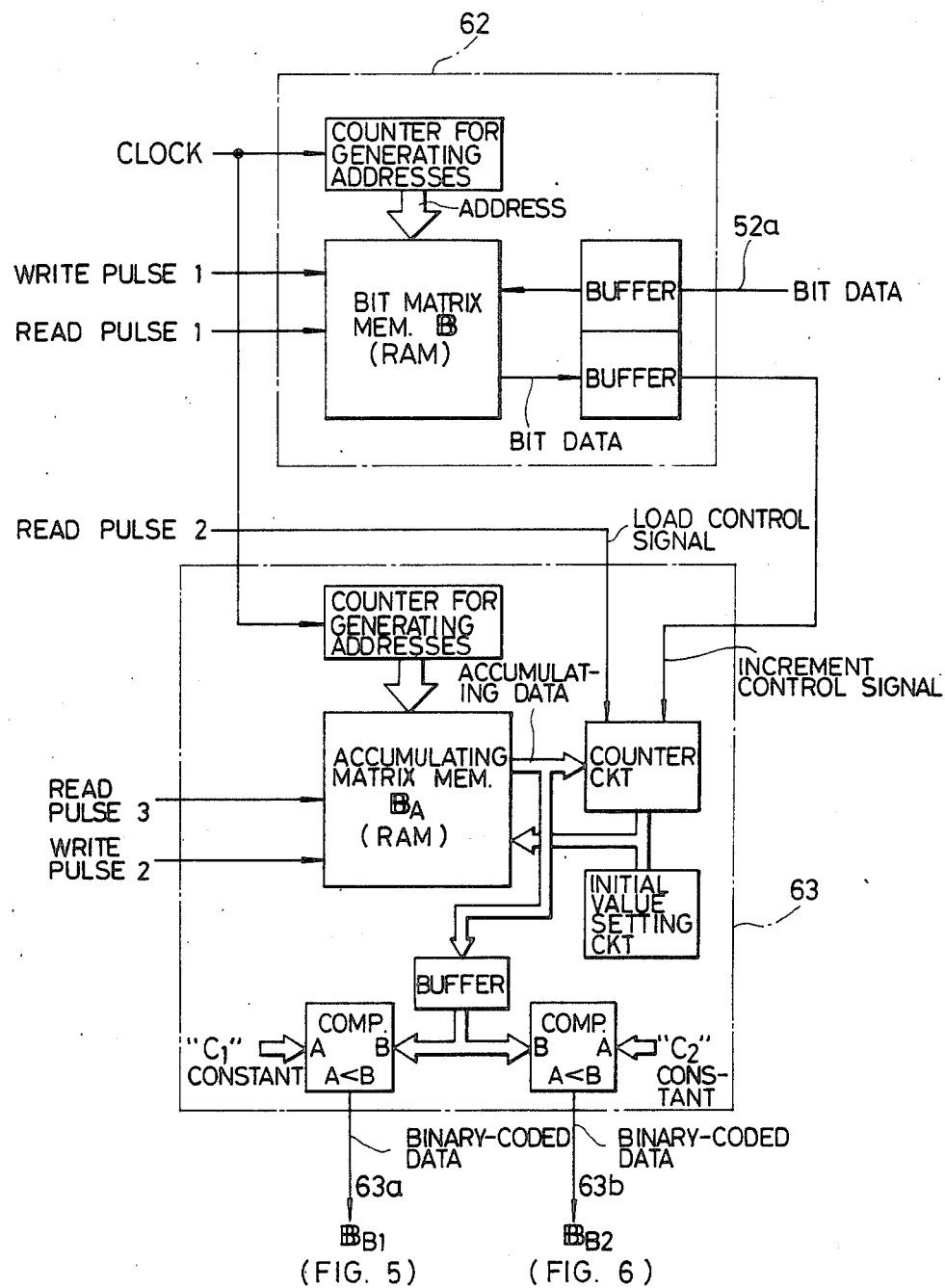
FIG. 1(c) is a circuit diagram of the bit matrix memory and bit matrix accumulating section of FIG. 1(b)

FIG. 1(c) is a circuit diagram showing the bit matrix memory 62 and the bit matrix accumulating section 63 in detail.

In FIG. 1(c), the bit matrix data as shown in FIG. 3 is transferred from the frame memory 52 to a bit matrix memory (RAM) B in the bit matrix memory 62 to be stored therein. In the bit matrix accumulating section 63, an initial value setting circuit operates to produce an output to an accumulating matrix memory so that the content of the memory is reset to zero entirely at an initial stage. The transferring operation of the content of the bit matrix memory M to the accumulating matrix memory is equivalent to an increment of the accumulating matrix. Accordingly, the content of the accumulating memory is successively loaded to a counter in response to a read pulse signal, and then each value corresponding to the bit matrix element is subjected to an increment operation. The value thus obtained is again written in the accumulating memory. The number of increment operations is equal to the number of learning operations. The stored values are compared with constants C1 and C2, respectively, so as to produce accumulation matrices 63a and 63b.

Figure 1D:
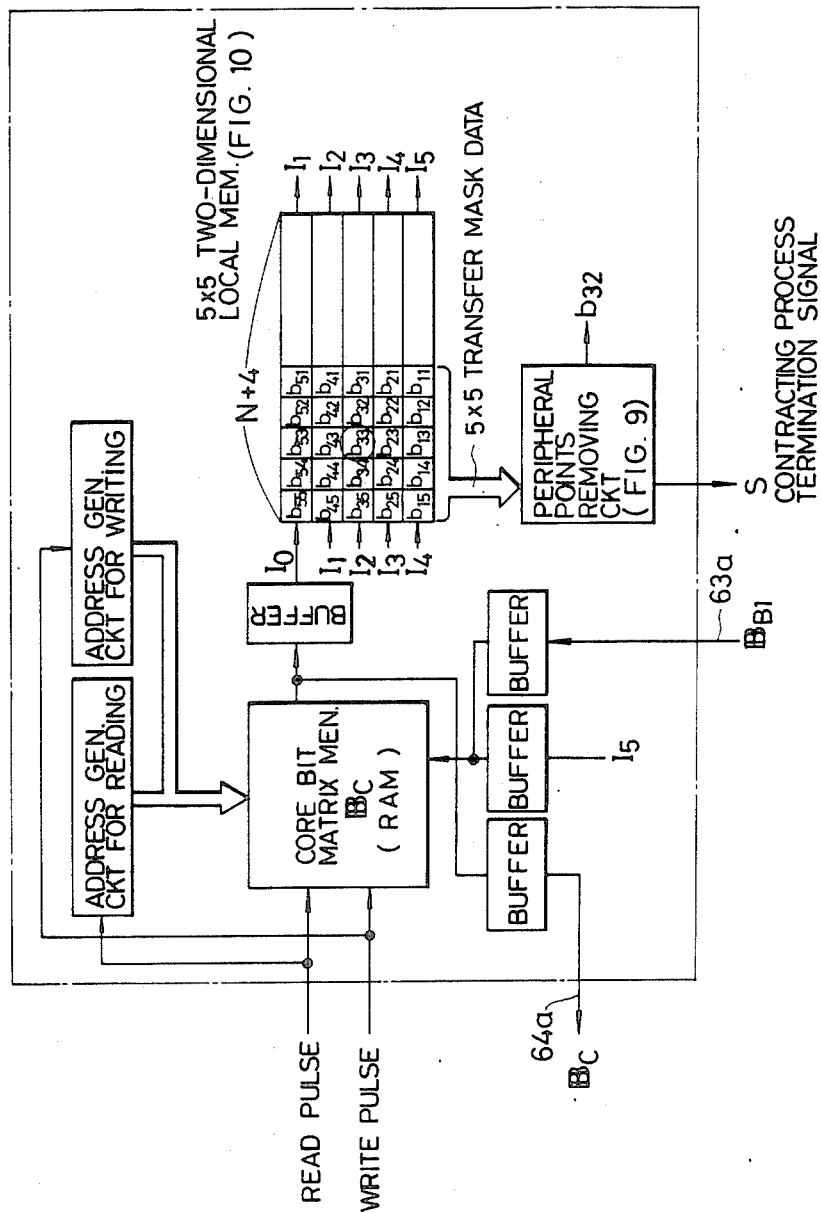
FIG. 1(d) is a circuit diagram of the core bit matrix forming section of FIG. 1(b)

FIG. 1(d) is a circuit diagram showing the core bit matrix forming section 64 in detail. In the circuit 64, the output 63a from the bit matrix accumulating section 63 is intially written in a core bit matrix memory (RAM). In this case, the matrix of $M \times N$ is added with additional matrix elements so as to be the matrix of $(M+4) \times (N+4)$ with zero being stored in the additional matrix elements. The values stored in the core bit matrix memory are written in a $5 \times 5$ two-dimensional local memory through a buffer. The $5 \times 5$ matrix data $b_{ij}$ (i, j = 1 to 5) which is defined by a $5 \times 5$ moving mask, is subjected to core element extraction operation according to FIG. 9 to produce an output b32. The output b32 is written at the portion b32 in the $5 \times 5$ mask in response to the shifting of the $5 \times 5$ mask. According to successive operations, the peripheral points are removed to be 0 so that the contracting operation is accomplished and the content of the core bit matrix memory is renewed. Upon the completion of the contraction operation, the core bit matrix data Bc is then stored in the core bit matrix memory 71.

Figure 1E:
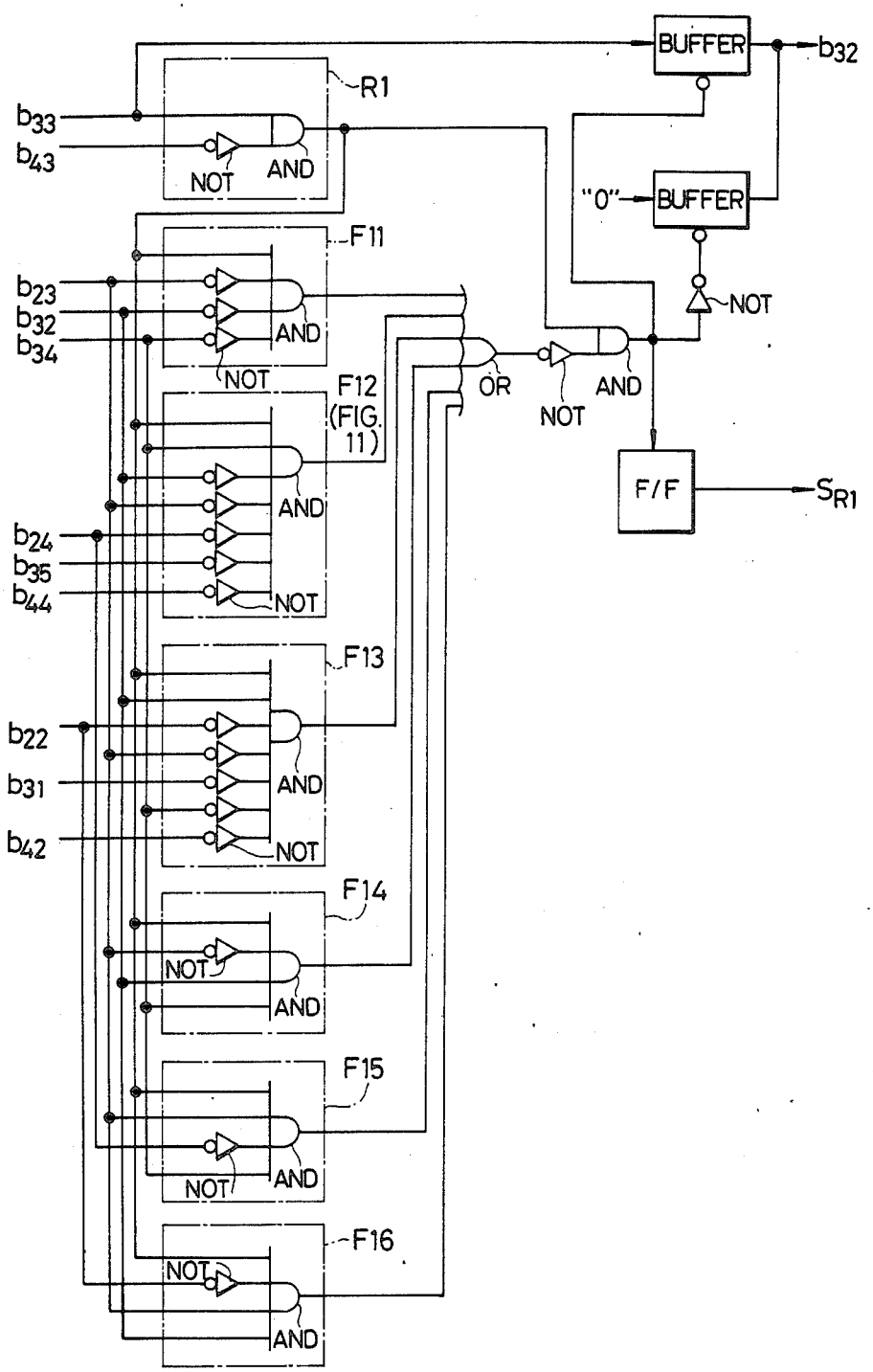
FIG. 1(e) is a circuit diagram of the peripheral points removing circuit of FIG. 1(d)

FIG. 1(e) is a circuit diagram showing a detailed circuit of the peripheral points removing circuit shown in FIG. 1(d). The circuit of FIG. 1(e) is an example for the points R1 and the circuits similar to the circuit are provided for the points R2 to R4, respectively, in the peripheral point removing circuit.

At first, the scanning operation of the circuit for the point R1 is completed for an entire image and then the scanning operation of the circuit for the point R2 starts. The scanning operations of the circuits for the points R3 and R4 are successively carried out. If no removing operation for all of the points R1 to R4 occurs, a stop signal S is produced by the core bit matrix forming section 64 to terminate the contracting operation. In this case, if at least one removing operation occurs, the scanning operation for all points R1 to R4 is repeated to detect the termination of the contracting operation.

Figure 1F:
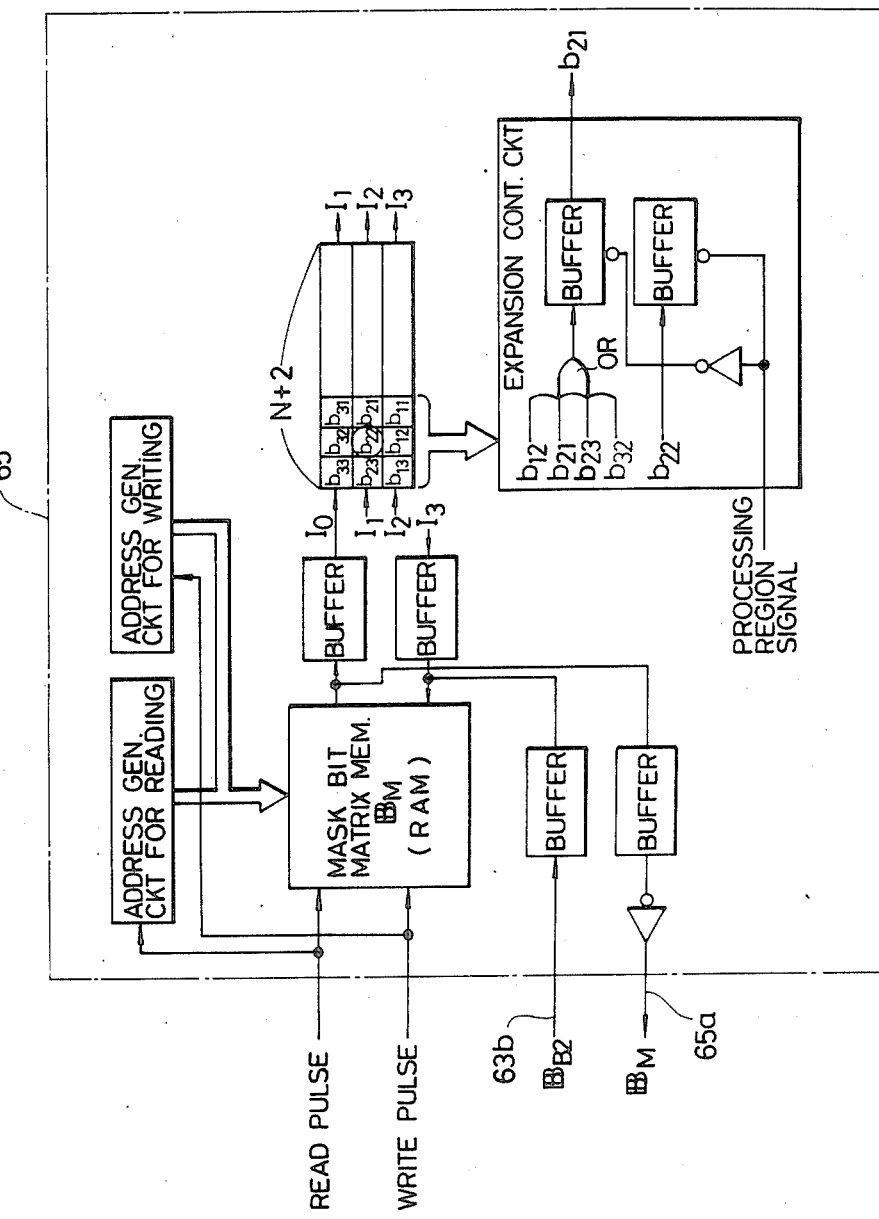
FIG. 1(f) is a circuit diagram of the mask bit matrix forming section of FIG. 1(b)

FIG. 1(f) is a circuit diagram showing the mask bit matrix forming section 65. In the circuit 65, the data 63b from the section 63 is written in a mask bit memory (RAM). In order to accomplish expansion processing, the bit matrix $M \times N$ is provided with additional bit elements so as to be a bit matrix of $(M+2) \times (N+2)$. The values of 0 are stored in the additional matrix elements. The matrix data is read out and written in a $3 \times 3$ local matrix memory. Thereafter, as is similar to the contracting operation, the expansion processing operation is accomplished to obtain an expansion output b21 for instance. The output is stored in the portion b21 of the moving mask. In the expansion processing operation, a mask is applied by a processing region defining signal so that the zero values stored outside of the $M \times N$ matrix region do not remain after the completion of the expansion operation. Generally, a few repetitions of the expansion operations are carried out to produce an output 65a. One example of this operation is shown in FIG. 8.

According to the present invention, the core bit matrix $B_C$ and the mask bit matrix $B_M$ are determined for pattern dictionaries according to the results of $N_L$ measurements. Therefore, the dictionary data are compressed, and the statistical variations can be absorbed. In identifying an unknown bit matrix $B_0$, the character separation distance $D_C$ and the character smudge distance $D_B$ are obtained by subjecting the matrix $B_0$ to an enlarging process and a contracting process, respectively. Therefore, the decision can be made according to the distances which are not affected by the line width variations. As the two distances are employed with respect to the reading (identifying) decision reference, the allowance for character separation and the allowance for character smudge can be changed separately. In other words, if a character is separated, then the separation can be freely accepted in the reading operation. Similarly, if a character is smudged, the smudge can be freely accepted. Thus, the erroneous reading rate can be greatly reduced.

I claim:

1. A character identifying device for identifying an unknown character pattern by processing input video signals generated by scanning the unknown character pattern and reference video signals generated by scanning reference character patterns, the device comprising:

binary coding means for generating reference and input binary coded signals corresponding respectively to the reference and input video signals;

feature data extracting means for dividing said reference binary coded signals into segments and for extracting feature data from said segments, wherein said segments of each of said reference binary coded signals correspond to different portions of the corresponding reference character patterns, and wherein the feature data extracted from each of said segments includes coupling features identifying the corresponding one of said reference character patterns;

coupling characteristic analyzing means for analyzing said coupling features of said segments by processing said feature data;

bit matrix forming means for generating at least one bit matrix for each of the reference character patterns by combining selected ones of said segments in accordance with the coupling features thereof, each of said bit matrices comprising a plurality of matrix elements having a first value if said matrix element corresponds to a portion of that reference character pattern or a second value if said matrix element does not correspond to a portion of that reference character pattern;

accumulation matrix forming means for generating for each of said reference character patterns an accumulation matrix having substantially the same size as the at least one bit matrix for the corresponding reference character pattern, each of said accumulation matrices including a plurality of accumulation matrix elements each corresponding to a different one of the elements in the at least one bit matrix for the corresponding reference character pattern and each of said accumulation matrix elements having values substantially equal to the number of corresponding elements of the at least one bit matrix for the same reference character patterns which have said first value;

means for forming, for each of said accumulation matrices, a core bit matrix and an associated mask bit matrix each said core bit and mask bit matrix including a plurality of core bit elements and mask bit elements, respectively, each associated with a corresponding accumulation matrix element wherein each of said core bit elements has said first value and each of said associated mask bit elements has said second value if the value of the corresponding accumulation matrix element is greater than a first accumulation value and a second accumulation value, respectively, and bears a predetermined relationship to other core bit elements and mask bit elements, respectively;

operating means for generating an enlarged bit matrix and a contracted bit matrix from said input binary coded signals, said enlarged bit matrix including a plurality of bit matrix elements representing an enlargement of said unknown character pattern and said contracted bit matrix including a plurality of bit matrix elements representing a contraction of said unknown character pattern; and first calculating means for comparing the elements of said enlarged bit matrix and said core bit matrices for said reference patterns to obtain character separation distances; and second calculating means for comparing the elements of said contracted bit matrix and said mask bit matrices for said reference patterns to obtain character smudge distances;

whereby said character separation distances and said character smudge distances can be used to identify said known character pattern as one of said reference character patterns.

2. A character identifying device according to claim 1, further including first, second, and third memories for storing said accumulation matrices, said core bit matrices, and said mask bit matrices, respectively.

* * * * *